*US011123914B2*

(12) United States Patent
Protais et al.

(10) Patent No.: US 11,123,914 B2
(45) Date of Patent: Sep. 21, 2021

(54) METHOD FOR MANUFACTURING A CONTAINER INCLUDING BOXING TIMED WITH BLOWING

(71) Applicant: SIDEL PARTICIPATIONS, Octeville-sur-Mer (FR)

(72) Inventors: Pierrick Protais, Octeville-sur-Mer (FR); Franck Santais, Octeville-sur-Mer (FR); Mikael Derrien, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 344 days.

(21) Appl. No.: 15/531,140

(22) PCT Filed: Nov. 23, 2015

(86) PCT No.: PCT/FR2015/053166
§ 371 (c)(1),
(2) Date: May 26, 2017

(87) PCT Pub. No.: WO2016/083711
PCT Pub. Date: Jun. 2, 2016

(65) Prior Publication Data
US 2017/0326780 A1 Nov. 16, 2017

(30) Foreign Application Priority Data

Nov. 27, 2014 (FR) ..................................... 1461575

(51) Int. Cl.
*B29C 49/48* (2006.01)
*B29C 49/06* (2006.01)
*B29C 49/12* (2006.01)
*B29C 49/78* (2006.01)
*B29C 49/36* (2006.01)
*B29L 31/00* (2006.01)

(52) U.S. Cl.
CPC .............. *B29C 49/48* (2013.01); *B29C 49/06* (2013.01); *B29C 49/12* (2013.01);
(Continued)

(58) Field of Classification Search
CPC ....... B29C 49/48; B29C 49/783; B29C 49/06; B29C 49/12; B29C 49/4802; B29C 49/36;
(Continued)

(56) References Cited

U.S. PATENT DOCUMENTS 5,122,327 A 6/1992 Spina et al.
5,470,218 A * 11/1995 Hillman ................ B29C 45/768
264/40.6
(Continued)

FOREIGN PATENT DOCUMENTS

EP 1 922 256 B1 12/2009
EP 2 173 637 B1 9/2011
(Continued)

OTHER PUBLICATIONS

International Search Report, dated Feb. 23, 2016, from corresponding PCT application.

*Primary Examiner* — Galen H Hauth

(57) ABSTRACT

Disclosed is a method for manufacturing a container from a blank in a mold provided with a movable insert, wherein the method includes the following phases: pre-blowing; blow molding; boxing; and the following operations: measuring the prevailing pressure in the blank in real-time and storing the measurement in a memory; measuring the position of the insert in real-time and storing the measurement in a memory; detecting a time $t_{S2}$ indicating the actual start of the blowing phase and moment $t_{B2}$ indicating the actual start of movement of the insert and storing same in a memory; calculating $T1=t_{S2}-t_{B2}$; comparing T1 with a predetermined non-zero reference $T1_{ref}$ as long as T1 is different from $T1_{ref}$ and delaying the start of the boxing phase.

20 Claims, 4 Drawing Sheets

(52) U.S. Cl.
CPC ........ *B29C 49/4802* (2013.01); *B29C 49/783* (2013.01); *B29C 49/36* (2013.01); *B29C 2049/4807* (2013.01); *B29C 2049/4892* (2013.01); *B29L 2031/712* (2013.01)

(58) Field of Classification Search
CPC ..... B29C 2049/4892; B29C 2049/4807; B29L 2031/712
See application file for complete search history.

(56) References Cited

U.S. PATENT DOCUMENTS

| | | |
|---|---|---|
| 8,950,611 B2 | 2/2015 | Derrien et al. |
| 9,676,140 B2 * | 6/2017 | Deau ........................ B29C 49/56 |
| 9,676,158 B2 * | 6/2017 | Genre et al. ......... B29D 22/003 |
| 9,688,013 B2 * | 6/2017 | Derrien .................... B29C 49/12 |
| 2009/0139996 A1 | 6/2009 | Jacson et al. |
| 2010/0204819 A1 | 8/2010 | Monin et al. |
| 2011/0298162 A1 | 12/2011 | Chomel et al. |
| 2012/0207873 A1 * | 8/2012 | Eberle ..................... B29C 49/12 425/528 |
| 2014/0203481 A1 | 7/2014 | Derrien et al. |

FOREIGN PATENT DOCUMENTS

| | | | |
|---|---|---|---|
| EP | 2 709 821 A1 | 3/2014 | |
| FR | 2 998 207 A1 | 5/2014 | |
| WO | WO-2012035260 A1 * | 3/2012 | ............. B29C 49/12 |
| WO | 2012/156638 A1 | 11/2012 | |
| WO | WO-2012156614 A1 * | 11/2012 | ............. B29C 49/12 |
| WO | 2014/080109 A1 | 3/2014 | |

* cited by examiner

METHOD FOR MANUFACTURING A CONTAINER INCLUDING BOXING TIMED WITH BLOWING

The invention relates to the manufacturing of containers by forming blanks made of plastic material such as polyethylene terephthalate (PET).

A standard technique for manufacturing containers is blow molding (optionally coupled with stretching). This technique consists in inserting the blank (i.e., a preform or an intermediate container that has undergone a preforming operation), heated in advance to a temperature that is higher than the glass transition temperature of the material (approximately 80° C. in the case of PET), into a mold that is provided with a wall that defines a cavity bearing the impression of the container, and in injecting into the blank, through an opening with which it is provided in the area of its neck, a fluid, such as a pressurized gas (in general air), to flatten the material against the wall of the mold. More specifically, the forming in general comprises two consecutive phases: a pre-blow-molding phase during which a fluid is injected into the blank at a pre-blow-molding pressure, and a blow-molding phase during which a fluid is injected into the blank at a blow-molding pressure that is higher than the pre-blow-molding pressure. In the standard methods, where air is used to carry out the forming, the pre-blow-molding pressure is between 5 and 10 bar, and the blow-molding pressure is between 20 and 40 bar.

For certain applications, it is necessary to form on the container recessed reserved places, in particular for aesthetic purposes (for example, the creation of curves), for functional purposes (production of a handle for gripping the container), or for structural purposes (for example, the production of side panels or a bottom that has undergone an additional stretching, intended to absorb the deformation of the container during a hot filling).

When such a reserved place reaches a certain depth, the container cannot be formed in an ordinary mold because, despite the high blow-molding pressure, the former is inadequate for perfectly applying the material against the relief of the mold that is intended to form the reserved place, primarily in the zones turned opposite to the neck of the container from which the blow-molding bubble is developed.

Also, use is usually made of molds provided with movable inserts that are initially retracted into the wall of the mold and deployed during forming to push back the wall of the container, as is illustrated in the European patent application EP 1 922 256 or the corresponding U.S. patent application US 2009/139996 (Sidel).

This technique, commonly called "boxing," is used in particular for the forming of containers provided with an integrated handle, or with a bottom that has undergone an additional stretching and is intended to absorb the deformation of the container during a hot filling, cf. the European patent application EP 2 173 637 (Sidel).

The boxing technique is complex because, based on the shape and the depth of the reserved places to be produced, the pushing back performed by the insert can lead to a thinning of the material, and even to a local rupture of the wall of the container that makes it unusable. This is why the adjustment of the machines dedicated to the boxing is difficult; it is in general entrusted to experienced operators whose dexterity makes it possible to produce by guesswork consistent containers. It is common, however, that the adjustment parameters (in particular the pressure, the blow-molding flow rate, and the speed of motion of the insert), initially correct, undergo during manufacturing uncontrolled drifts that affect the quality of the containers. With the experienced operators not always being available to correct the adjustments, it is sometimes necessary to halt the production line to prevent the accumulation of sub-standard containers.

In addition, it was determined that the quality of the containers—in particular as regards mechanical performances—is derived from a precise adjustment of the boxing phase in relation to the pre-blow-molding and blow-molding phases. It was determined in particular that it is advantageous to initiate the boxing before the blow molding, cf. the European patent application EP 2 709 821 (Sidel).

However, tests have demonstrated that this sole criterion may be inadequate for ensuring a good quality of the container.

The purpose of the invention is consequently to enhance even more the manufacturing techniques with boxing, to improve the quality of the containers produced.

For this purpose, a method for manufacturing a container from a blank made of plastic material, within a mold that is provided with a wall defining a cavity bearing the impression of the container, and an insert that can move in relation to the wall between a retracted position and a deployed position is proposed, with this method comprising, after an operation for inserting the blank into the mold:

A pre-blow-molding phase comprising the injection into the blank of a fluid at a pre-blow-molding pressure;
  A blow-molding phase, following the pre-blow-molding phase and comprising the injection into the blank of a fluid at a blow-molding pressure that is higher than the pre-blow-molding pressure;
  A boxing phase that comprises the movement of the insert from its retracted position to its deployed position;

with this method also comprising the operations that consist in:

Measuring in real time the pressure that prevails in the blank;
  Storing the values of the pressure that is measured and their respective measuring times;
  Measuring in real time the position of the insert;
  Storing the values of the measured position of the insert and their respective measuring times;
  Starting from the stored values of the pressure in the blank, detecting and storing an instant in time $t_{S2}$ that marks the real beginning of the blow-molding phase;
  Starting from the measured position values of the insert, detecting and storing an instant in time $t_{B2}$ that marks the real beginning of the movement of the insert;
  Calculating the interval, denoted T1, separating $t_{B2}$ from $t_{S2}$;
  Comparing the interval T1 to a non-zero predetermined reference value $T1_{ref}$;
  As long as the interval T1 is declared to be different from the reference value $T1_{ref}$, offsetting the initiation of the boxing phase.

This method starts from the hypothesis, formulated following tests conducted on numerous containers, that to obtain containers that are produced with high and primarily constant quality (in particular when the insert is a mold bottom, in terms of mechanical performances of the bottom of the container), it is necessary to keep constant the advance (expressed above in terms of the interval denoted T1) of the boxing on the blow molding (by assuming the blow molding itself to be standard). The automatic correction is carried out when a drift is noted in the advance T1, from one cycle to the next in a first case, or periodically after data have been collected on multiple cycles in a second case. This correction (which corresponds, for example, in the second case, to an average calculated over several cycles) makes it possible to manufacture containers in accordance with a standard of high quality without, however, resorting to a manual adjustment of the machine.

The offsetting that is mentioned can consist, as long as the interval T1 is declared to be less than the reference value $T1_{ref}$, in advancing the boxing phase.

In the case where the insert is integral with the rod of a cylinder that is fed with pressurized fluid by means of a distributor with a controlled opening, the offsetting of the initiation of the boxing phase consists in offsetting the opening command of the distributor.

The following additional operations can be provided:
  Starting from the measured position values of the insert, detecting an instant in time $t_{B3}$ in which the insert reaches its top position;
  Calculating the interval, denoted T2, separating $t_{B3}$ from $t_{B2}$,
  Comparing the interval T2 with a non-zero predetermined reference value $T2_{ref}$;
  As long as the interval T2 is declared to be different from the reference value $T2_{ref}$, modifying the speed of motion of the insert during the boxing phase.

In the case where the insert is integral with the rod of a cylinder that is fed by pressurized fluid, provided in addition are the operations that consist in:
  Measuring the position of the insert at the instant in time $t_{S2}$ marking the real beginning of the blow-molding phase,
  Verifying whether the position of the insert is between two predetermined values and whether T2 is also between two predetermined values,
  If these two conditions are not jointly met, generating an alert.

In addition, in the case where the cylinder is connected to a drain by means of a flow modifier, an operation that consists in modifying the flow of fluid in the area of the flow modifier can be provided if the position of the insert is not encompassed between two predetermined values or if T2 is not encompassed between two predetermined values.

As a variant, it is possible to provide the following operations:
  Starting from the stored values of the pressure in the blank, detecting and storing an instant in time $t_{S3}$ in which the pressure in the blank ceases to grow during the blow-molding phase;
  Starting from measured position values of the insert, detecting an instant in time $t_{B3}$ in which the insert reaches its top position;
  Calculating the interval, denoted T3, separating $t_{S3}$ from $t_{B3}$;
  Comparing the interval T3 with a non-zero predetermined reference value $T3_{ref}$;
  As long as the interval T3 is declared to be different from the reference value $T3_{ref}$, modifying the speed of motion of the insert during the boxing phase.

In the case where the insert is integral with the rod of a cylinder that is fed by pressurized fluid by means of a distributor with a controlled opening and a pressure modifier, the modification of the speed of motion of the insert can consist in acting on the pressure modifier to modify the pressure of the fluid feeding the cylinder.

In the case where the insert is integral with the rod of a cylinder that is fed by pressurized fluid by means of a distributor with a controlled opening, the following additional operations can be provided:
  Measuring a response time of the cylinder and/or a response time of the distributor, and
  Comparing this response time to a predetermined threshold value,
  When this response time is greater than the reference value, generating an alert.

In addition, in the case where the insert is integral with the rod of a cylinder that is fed by pressurized fluid by means of a distributor with a controlled opening and with a pressure modifier, with the cylinder also being connected to a drain by means of a flow modifier, the operations that consist, if the flow rate in the area of the modifier reaches a minimum, or a maximum, in commanding the pressure modifier to decrease, or increase, the pressure that is injected into the cylinder, can in addition be provided.

Other objects and advantages of the invention will become evident from the description of an embodiment, given below with reference to the accompanying drawings, in which.

Figure 1:
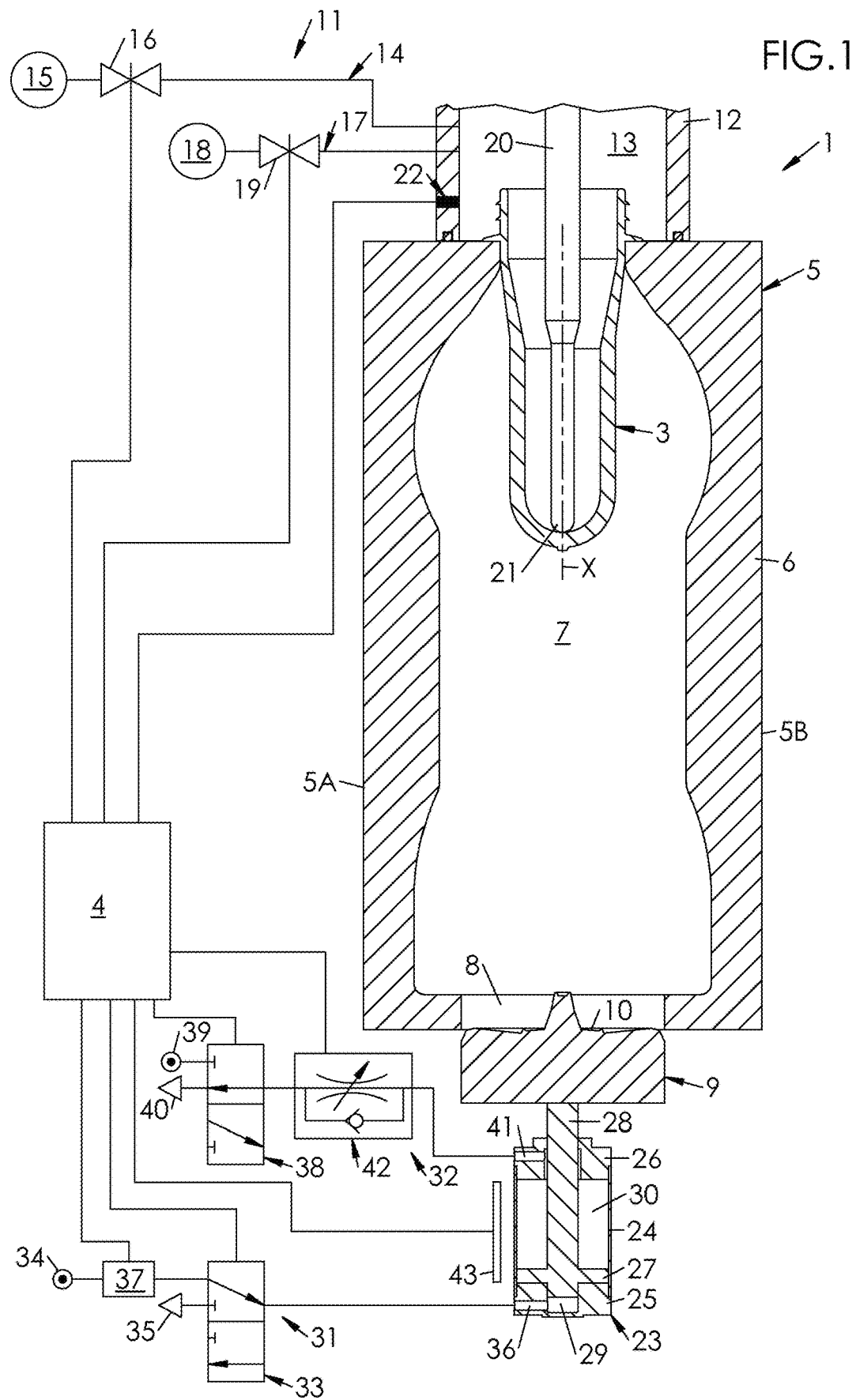
FIG. 1 is a diagrammatic cutaway view that shows a forming unit that is equipped with a mold in which the forming of a container takes place, shown at the instant in time of the beginning of the pre-blow-molding phase.

FIG. 1 shows a unit 1 for forming a container 2 by stretch blow molding starting from a blank 3 made of plastic material, in particular made of PET (polyethylene terephthalate). The blank 3 can be a crude injection preform (as in the illustrated example) or an intermediate container that is obtained by one or more previous forming operations carried out on a crude preform.

In practice, the forming unit 1 is mounted, with other similar forming units 1, on a rotating carrousel of a forming machine.

The forming unit 1 is directed in an automatic manner by a control unit 4 that comprises at least one controller (for example, of the API type—acronym for industrial programmable machine) that is equipped with actuators.

In the first place, the forming unit 1 comprises a mold 5 that is provided with a wall 6 that defines a cavity 7 bearing the impression of the container 2 that is to be formed, which extends along a main axis X and has an opening 8, and an insert 9 that is mounted to move in the opening 8 in relation to the wall 6. The insert 9 is provided with an inner surface 10 with the impression of a reserved place to be formed recessed on the container 2. According to an embodiment that is illustrated in the drawings, this reserved place is a bottom of the container, whose additional stretching achieved by the movability of the insert 9 during the forming leads to a better structural rigidity thanks to an increase in the crystallinity of the material. Below, it is assumed that the insert 9 is a mold bottom. In this case, the opening 8 is produced axially in the bottom part of the wall 6.

In a variant, not shown, the recessed reserved place is intended, for example, to form a handle or to receive a connected handle. In this case, the insert would be placed on one side of the wall 6, and the opening would be produced radially on this side. The operating mode of such an insert would be the same as the one disclosed below, where the insert 9 is a mold bottom.

Figure 3:
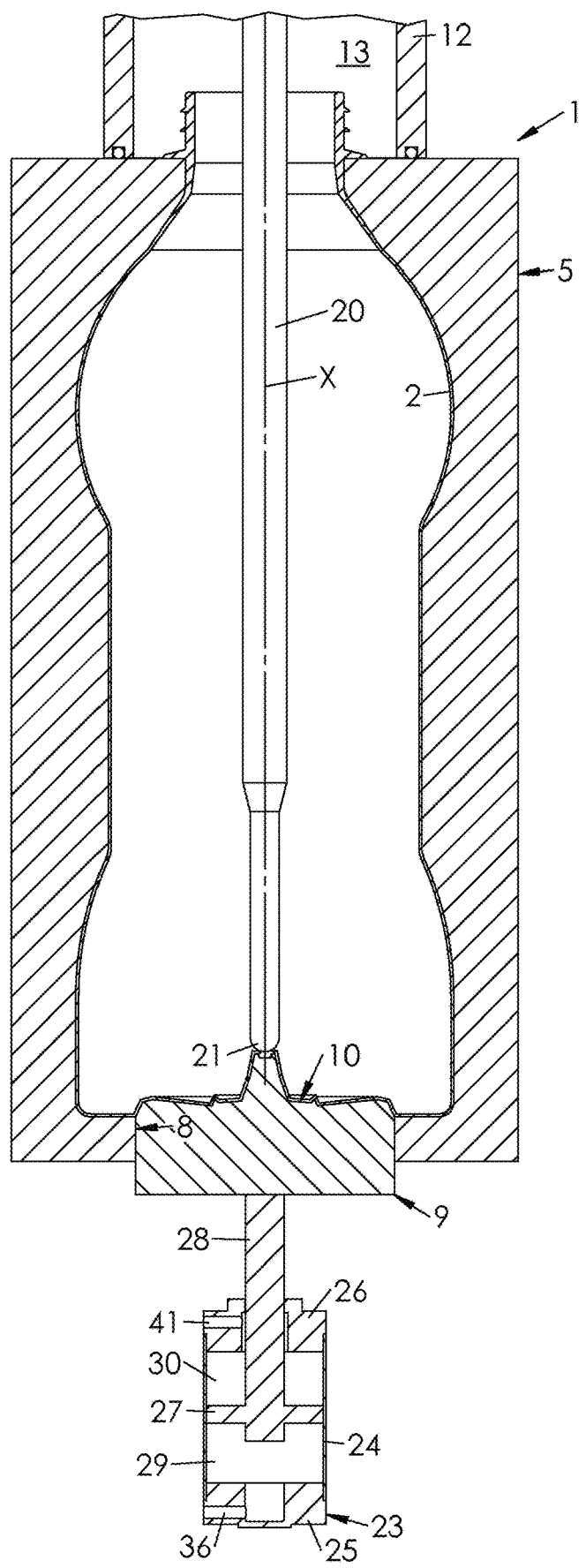
FIG. 3 is a view that is similar to FIG. 1, illustrating the end of the boxing phase.

The mold bottom 9 is mounted to move in relation to the wall 6 between a retracted (or bottom) position, illustrated in FIG. 1, in which the mold bottom 9 extends in a setback manner in relation to the cavity 7 by being separated from the opening 8, and a deployed or top position, illustrated in FIG. 3, in which the mold bottom 9 blocks the opening 8, and in which the inner surface 10 closes the cavity 7 by thus completing the impression of the container 2. "Travel" of the mold bottom is called the distance, denoted C, separating its bottom position from its top position.

The mold 5 is, for example, of the portfolio type and comprises two half-molds 5A, 5B that are articulated around a common hinge and that open to make possible, successively, the evacuation of a formed container 2 and the insertion of a blank 3, previously heated in a thermal conditioning machine placed upstream from the forming machine.

Figure 2:
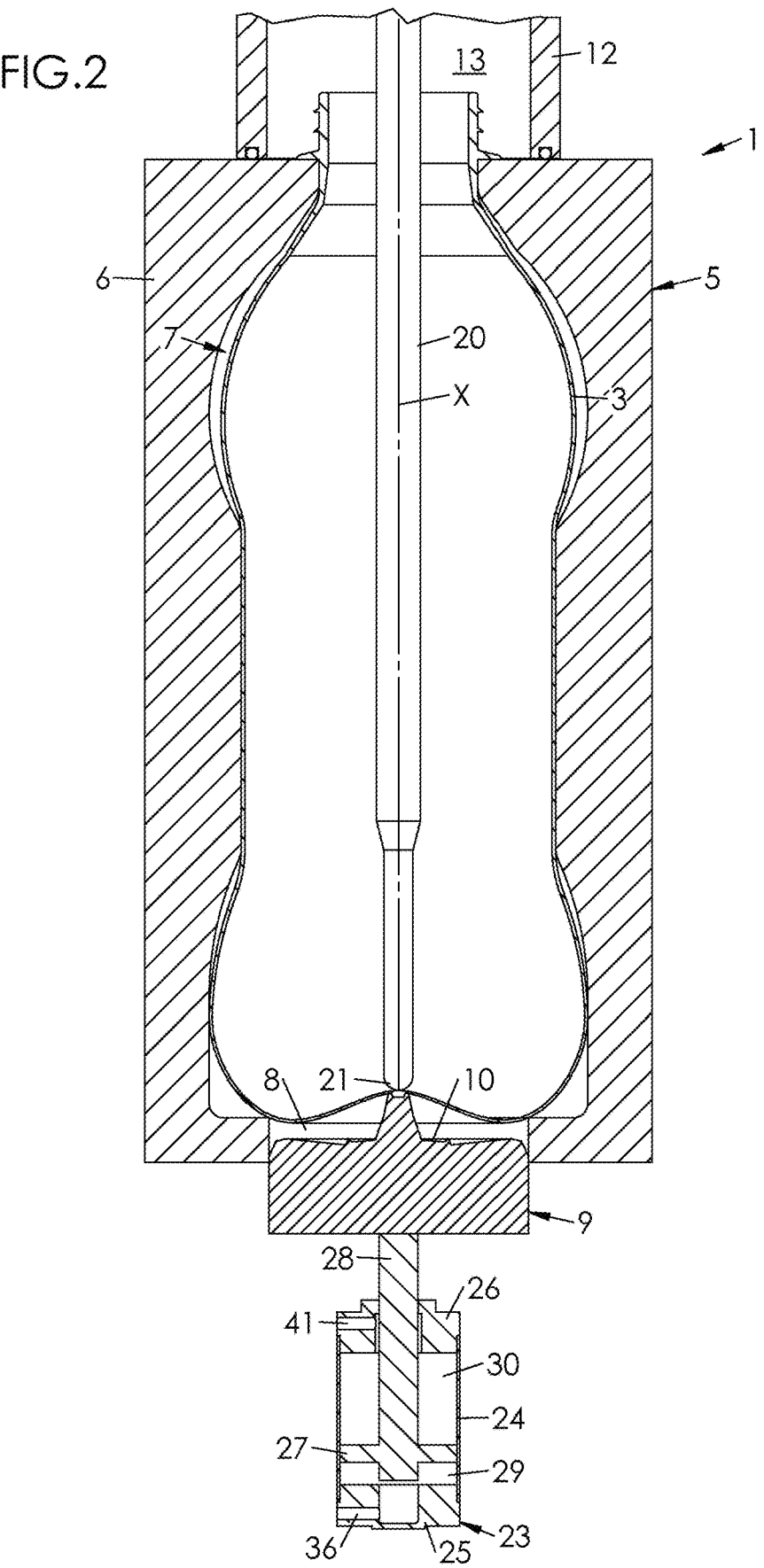
FIG. 2 is a view that is similar to FIG. 1, illustrating the end of the pre-blow-molding phase.

Each forming unit 1 comprises, in the second place, an injection device 11 that comprises a nozzle 12 that defines an injection chamber 13. The nozzle 12 is mounted perpendicular to the mold 5 by being movable axially in relation to the former between a disconnected position, in which the nozzle 12 is separated from the mold to make possible both the insertion of a blank 3 into the former and the evacuation of the former from a formed container 2, and a connected position (illustrated in FIGS. 1 to 3), in which the nozzle 12 is applied in an airtight manner against the mold 5 around the blank 3 to ensure the fluid connection from the injection chamber 13 to the interior of the blank 3.

The injection device 11 further comprises a pre-blow-molding fluid circuit 14, which has a fluid connection from the injection chamber 13 to a fluid source 15 at a so-called pre-blow-molding pressure, by means of a pre-blow-molding solenoid valve 16 that is directed by the control unit 4. In practice, the fluid is a gas, such as air. The pre-blow-molding pressure is, for example, between 5 and 10 bar.

The injection device 11 also comprises a fluid blow-molding circuit 17, which has a fluid connection from the injection chamber 13 to a fluid source 18 at a so-called blow-molding pressure, higher than the pre-blow-molding pressure, by means of a blow-molding solenoid valve 19 that is directed by the control unit 4. In practice, the fluid is air. The blow-molding pressure is, for example, between 20 and 40 bar. The injection device 11 comprises, finally, a degassing circuit (not shown), which has a fluid connection from the injection chamber 13 to the free air, by means of a solenoid valve for exposure to air that is also directed by the control unit 4.

In the third place, each forming unit 1 comprises a stretching unit that is equipped with a stretching rod 20 that extends along the axis X of the mold 5 and up to a rounded distal end 21 and is mounted to move axially in relation to the mold 5. The rod 20 extends axially through the nozzle 12, in an airtight manner.

The forming unit 1 also comprises a pressure sensor 22 mounted on the nozzle 12 to measure the pressure prevailing in the injection chamber 13, which is identical to that prevailing in the blank 3 and then in the container 2. The sensor 22 is connected to the control unit 4 that stores the values thereof at each instant in time (according to a predetermined period, for example on the order of several milliseconds).

In the fourth place, the forming unit 1 comprises an actuator 23 for the monitoring of the position of the mold bottom 9. According to an embodiment that is illustrated in FIG. 1, this actuator 23 comes in the form of a cylinder that is provided with a cylindrical jacket 24, a lower wall 25, and an upper wall 26 closing the jacket 24 at each one of its ends, and a piston 27 that is mounted to slide in the jacket 24 between the walls 25, 26. The piston 27 is integral with a rod 28 that passes through the upper wall 26. The mold bottom 9 is mounted on the rod 28 at an upper end of the former that projects outside of the upper wall 26. The attachment of the mold bottom 9 to the rod 28 can be carried out in a conventional manner, typically by screwing.

The piston 27 and the rod 28 are integrally movable in relation to the jacket 24 between a retracted position, corresponding to the retracted position of the mold bottom 9 (FIG. 1), and a deployed position, corresponding to the deployed position of the mold bottom 9.

In the illustrated example, the cylinder 23 is of the double-action type. The piston 27 delimits, on the one hand, with the lower wall 25, a primary chamber 29, and, on the other hand, with the upper wall 26, a secondary chamber 30. To control the cylinder 23, the forming unit 1 comprises a primary fluid circuit 31 and a secondary fluid circuit 32.

The primary fluid circuit 31 comprises a primary distributor 33 of the 3/2 type (three openings, two positions; this type of distributor can be exposed to a three-way solenoid valve) directed by the control unit 4. The primary distributor 33 has a first input by which it is connected to a primary source 34 of pressurized fluid (which can be combined with the source 18 of fluid at the blow-molding pressure) and a second input by which it is connected to a drain 35. The primary distributor 33 has, furthermore, an output by which it is connected to the primary chamber 29, via a primary opening 36 made in the lower wall 25. According to a preferred embodiment that is illustrated in FIG. 1, a pressure modifier 37 is inserted between the primary source 34 and the first input of the primary distributor 33 and is connected to the control unit 4, which ensures the command thereof. The modifier 37 has as its function to vary the pressure in the primary chamber 29, according to instructions dictated by the control unit 4, in particular based on the capacity of the container 2 to be formed, and more specifically based on the diameter of the mold bottom 9.

The secondary circuit 32 comprises a secondary distributor 38 of the 3/2 type directed by the control unit 4. The secondary distributor 38 has a first input by which it is connected to a secondary source 39 of pressurized fluid (which can be combined with the source 18 of fluid at the blow-molding pressure and with the primary source 34) and a second input by which it is connected to a drain 40. The secondary distributor 38 furthermore has an output by which it is connected to the secondary chamber 30, via a secondary opening 41 made in the upper wall 26. According to an embodiment that is illustrated in FIG. 1, the secondary fluid circuit 32 comprises a flow modifier (or restrictor) 42 that is inserted between the secondary distributor 38 and the secondary opening 41. The flow modifier 42 has as its function to modulate the flow of fluid injected into the secondary chamber 30, and therefore the speed of motion of the piston 27 (and of the mold bottom 9 that is integral with it).

According to an alternative embodiment, the cylinder 23 is electric.

Finally, the forming unit 1 comprises a position sensor 43 of the mold bottom 9, connected to the control unit 4. With the mold bottom 9 being integral with the piston 27, the sensor 43 can measure the position of the former. It may be a capacitive sensor, a magnetic sensor, or else an optical sensor. With the stretching rod 20 being kept in contact with the mold bottom 9 (the material of the bottom of the container 2 being sandwiched between them) during the boxing phase, the measurement of the position of the mold bottom 9 can be carried out by the measurement of the position of the rod 20, as described in the French patent application FR 2 998 207 or its international equivalent WO 2014/080109.

The manufacturing of a container 2 starting from a blank 3 (in particular a preform) during a forming cycle first of all comprises a preliminary phase for insertion of the blank 3 into the mold 5, directed into a position that is first open and then closed by the former, and in the bottom position of the mold bottom 9. Before its insertion into the mold 5, the blank 3 has first of all undergone heating at a temperature that is higher than the glass transition temperature of the material (approximately 80° C. in the case of the PET) in order to have a certain malleability.

Then provided is a pre-blow-molding phase of the blank 3, which comprises:
  The drop of the rod 20,
  As soon as the rod 20 reaches the bottom of the blank 3, the injection into the former of fluid at the pre-blow-molding pressure; for this purpose, the control unit 4 commands the opening of the pre-blow-molding solenoid valve 16 to ensure the fluid connection from the fluid source 15 at the pre-blow-molding pressure to the injection chamber 13 (and therefore to the blank 3).

It is assumed that the pre-blow-molding phase is consistent, i.e., that it does not have any manifest offsetting (in time or pressure) in relation to a predetermined blow-molding model.

The dropping rate of the rod 20 is such that it remains in contact with the bottom of the preform that constitutes the blank 3 until reaching the mold bottom 9.

The pre-blow molding brings about the swelling of the blank 3 until coming into only partial contact with the wall 6 and the mold bottom 9, with the pre-blow-molding pressure not being adequate to flatten the blank 3 completely against the wall 6. In other words, the impression-taking is inadequate.

This is why there is provided, following the pre-blow-molding phase, a blow-molding phase of the blank, which comprises the injection into the blank 3 of the fluid at the blow-molding pressure; for this purpose, the control unit 4 commands the closing of the pre-blow-molding solenoid valve 16 and the opening of the blow-molding solenoid valve 19 to ensure the fluid connection from the fluid source 18 at the blow-molding pressure to the injection chamber 13 (and therefore with the blank 3). The closing of the pre-blow-molding solenoid valve 16 is controlled by the control unit 4 simultaneously to (or with a slight delay on) the opening command of the blow-molding solenoid valve 19.

It is assumed that the blow-molding phase is consistent, i.e., that it does not have any manifest offsetting (in time or pressure) in relation to a predetermined blow-molding model.

As illustrated in the figures, a boxing phase is also provided, which phase comprises the movement of the mold bottom 9 from its bottom position to its top position. In its bottom position, the primary opening 36 of the cylinder 23 is in fluid communication with the drain 35, and the secondary chamber 30 is in fluid communication with the secondary source 39 of the pressurized fluid. To move the mold bottom 9 toward its top position, the control unit 4 directs:
  The primary distributor 33 for placing the primary opening 36 of the cylinder 23 in fluid communication with the primary fluid source 34;
  The secondary distributor 38 for placing the secondary opening 41 in fluid communication with the drain 40.

The piston 27 is then pushed back toward its top position under the pressure of the fluid in the primary chamber 29, against the resistant force of the fluid of the secondary chamber 30. According to an embodiment, the control unit 4 commands the pressure modifier 37 and the flow modifier 42 for modulating the speed of motion of the piston (and therefore of the mold bottom 9) and the thrust exerted on the former. The laws of command of the pressure modifier 37 and the flow modifier 42 can be based on the diameter of the mold bottom 9: it is actually preferable that the speed of motion (and therefore the flow) is high when the mold bottom 9 has a large diameter and comparatively lower when the mold bottom 9 has a small diameter.

The boxing phase is initiated with a slight advance on the blow-molding phase, so as in particular to prevent the pinching of the material between the mold bottom 9 and the opening 8 and primarily, as was noted, to form in the best possible manner the bottom of the container 2 when this advance is correctly adjusted. The boxing makes it possible to carry out an additional stretching on the bottom of the container 2, favorable to the orientation of the molecules (and therefore to the mechanical rigidity).

During the entire forming cycle, the pressure in the blank 3 is measured in real time, and the values of the measured pressure as well as their respective measuring times are stored by the control unit 4.

Likewise, during the forming cycle, the position of the mold bottom 9 is measured in real time by the sensor 43, and the values of the measured position of the mold bottom 9 as well as their respective measuring times are stored by the control unit 4.

Figure 4:
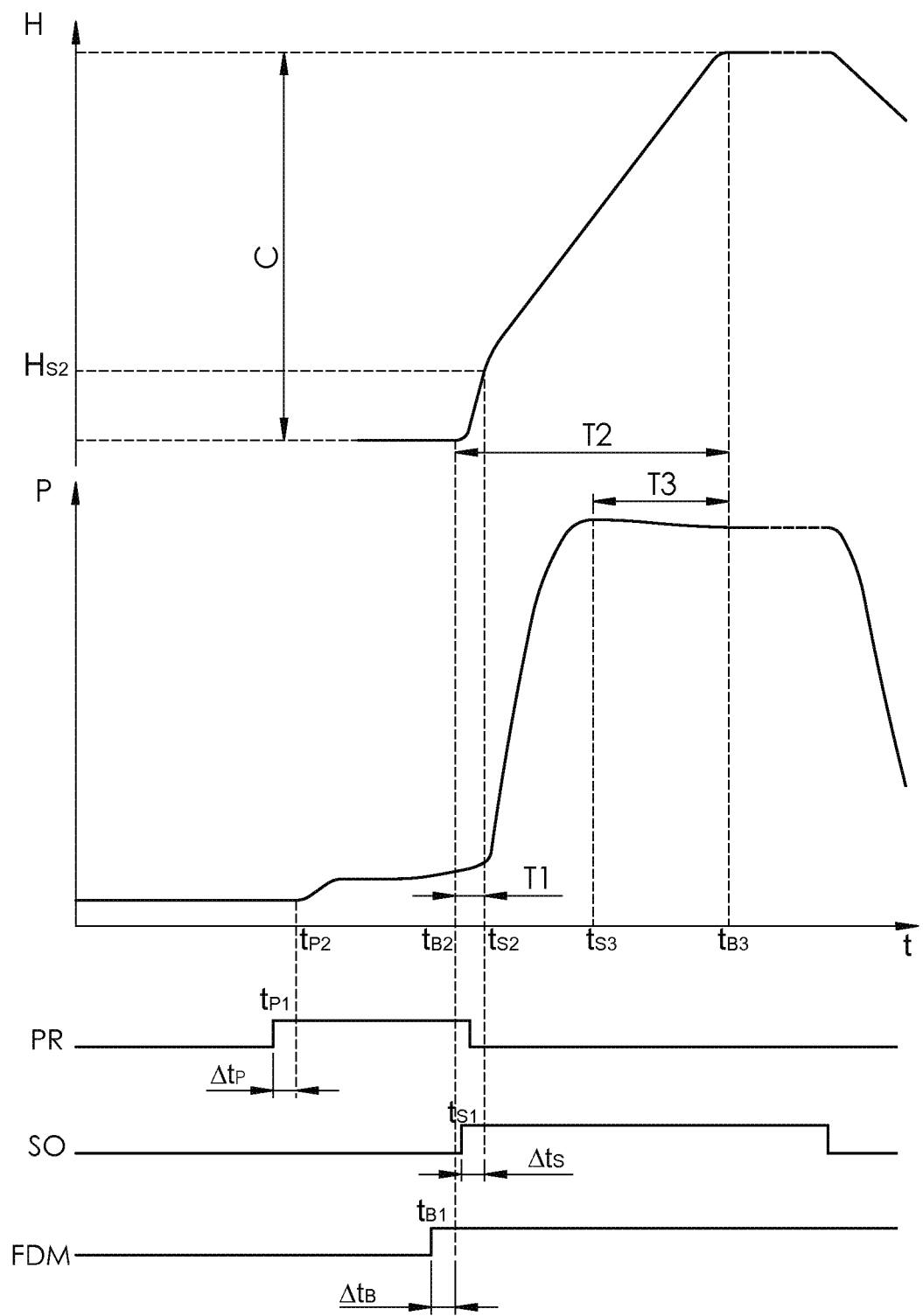
FIG. 4 is a diagram on which are traced in parallel, from top to bottom and in a manner synchronized in time:
  The boxing curve providing the evolution of the position of the insert over time,
  The pressure curve telling the evolution of the pressure that prevails in the container over time,
  The command chronograms of the phases of pre-blow-molding, blow-molding and boxing.

FIG. 4 shows the curves that represent, based on time (denoted t):
  At the top, the axial position (or height, denoted H) of the mold bottom 9;
  In the middle, the pressure (denoted P) that prevails in the blank 3 or in the container 2 during forming;
  At the bottom, the chronograms of the pre-blow-molding solenoid valve 16 (denoted PR), of the blow-molding solenoid valve 19 (denoted SO), and of the distributors 33, 38 (denoted FDM).

The curves are synchronized on the time axis that is common to them, with the vertical dotted lines making it possible to carry out a matching of the curves to certain instants in time.

As we have already mentioned, the measurements are made at regular intervals. These intervals can be defined by a clock concatenation that is provided by the control unit 4, less than or equal to the maximum concatenation with which the pressure sensor 22 and the position sensor 43 of the mold bottom can operate. The curves appear to be continuous in FIG. 4 because the control unit 4 can, by simple interpolation (in particular polynomial), thus construct them starting from point measurements provided by the sensors 22, 43.

The command for opening the pre-blow-molding solenoid valve 16 is provided at an instant in time $t_{P1}$ called "pre-blow-molding starting signal." With the pre-blow-molding solenoid valve 16 being assigned a response time $\Delta t_P$, the pressure P that prevails in the container 2 undergoes a rise starting from an instant in time $t_{P2}$, named "real pre-blow-molding start," such that $t_{P2}=t_{P1}+\Delta t_P$.

Likewise, the command for opening the blow-molding solenoid valve 19 is provided at an instant in time $t_{S1}$ that is named "blow-molding starting signal." With the blow-molding solenoid valve 19 being assigned a response time $\Delta t_S$, the pressure P that prevails in the container 2 undergoes an inflection (sudden growth) starting from an instant in time $t_{S2}$ named "real blow-molding start" such that $t_{S2}=t_{S1}+\Delta t_S$, which marks the real beginning of the blow-molding phase. The instant in time $t_{S2}$ is detected on the pressure curve by the control unit 4. For this purpose, and according to a particular embodiment, the function P(t) is obtained by interpolation starting from pressure measurements. Since the pressure P increases linearly at the end of the pre-blow molding, the drift of P(t) y is constant, in such a way that the control unit 4 can assign to the instant in time $t_{S2}$ the value of the instant in time where the drift of P(t) changes value. As a variant, the function P(t) is derived twice, and the control unit 4 assigns to the instant in time $t_{S2}$ the value of the instant in time where the double drift of P(t) ceases to be zero. These two techniques provide the same result. The instant in time $t_{S2}$ is stored by the control unit 4.

Finally, the command for opening the primary distributor 33 (i.e., the linking of the primary opening 36 of the cylinder 23 to the primary source 34) and, simultaneously, for closing the secondary distributor 38 (i.e., the linking of the secondary opening 41 to the drain 40) is provided at an instant in time $t_{B1}$ named "boxing starting signal." Assuming that the distributors 33, 38 are identical, $\Delta t_B$ denotes the cumulative response time of each distributor 33 or 38 and of cylinder 23, with the movement of the piston 27 (and therefore of the mold bottom 9) starting at an instant in time named "real boxing start" $t_{B2}$, such that $t_{B2}=t_{B1}+\Delta t_B$, which marks the real beginning of motion of the mold bottom 9. The instant in time $t_{B2}$ is detected on the boxing curve by the control unit 4. For this purpose, the control unit 4 assigns to the instant in time $t_{B2}$ the value of the instant in time starting from which the function H(t) (which can be calculated by polynomial interpolation starting from measurements of position) changes value, or starting from which the drift of H(t) ceases to be zero. The instant in time $t_{B2}$ is stored by the control unit 4.

Furthermore, $t_{S3}$ is denoted the instant in time where the pressure in the container 2 ceases to increase because of having reached its maximum (i.e., the blow-molding pressure), at which the pressure P remains approximately equal during a predetermined time period called a blow-molding stage or stabilization period. The instant in time $t_{S3}$ is detected on the pressure curve by the control unit 4. For this purpose, the control unit 4 detects, for example during the blow-molding phase, the cancellation of the drift of the function P(t) or the instant in time at which the pressure in the container 2 reaches the blow-molding pressure, optionally corrected by a predetermined value corresponding to the pressure drops that can affect the forming unit 1 and that corresponds to the beginning of the blow-molding stage. The instant in time $t_{S3}$ is stored by the control unit 4.

$t_{B3}$ then denotes the instant in time where the mold bottom 9 reaches its top position, having traveled its entire course C. The instant in time $t_{B3}$, which marks the end of the boxing, is advantageously subsequent to the instant in time $t_{S3}$, i.e., the boxing is to be completed after the beginning of the blow-molding stage (in other words, after the end of the rise in pressure of the container 2 due to the blow molding). The instant in time $t_{B3}$ is detected on the boxing curve by the control unit 4. For this purpose, the control unit 4 assigns to the instant in time $t_{B3}$ the value of the instant in time where the drift of the function H(t) is canceled out. The instant in time $t_{B3}$ is stored by the control unit 4.

As we have already indicated, and as is visible in FIG. 4, the boxing is initiated before the blow molding: $t_{B2}<t_{S2}$. The response times $\Delta t_S$ and $\Delta t_B$ that are assigned respectively to the blow-molding solenoid valve 19 and the distributors 33, 38 are programmed in the control unit 4, which takes them into account so that the opening command of the solenoid valve 19 and the distributors 33, 38 makes it possible to initiate the boxing before the blow molding.

It has been noted, however, that the only inequality $t_{B2}<t_{S2}$ is not adequate for ensuring a good quality of the container (in particular being a matter of mechanical performances of the bottom of the container 2). Actually, it is necessary that the interval T1 between the instant in time $t_{B2}$ of the real boxing start and the instant in time $t_{S2}$ of the real blow-molding start (T1=$t_{S2}-t_{B2}$) be essentially constant during the cycles and equal to a predetermined non-zero reference value, denoted $T1_{ref}$. The term "equal" does not mean that T1 and $T1_{ref}$ are strictly equal, but that the difference between them is imperceptible, i.e., less than several percent, typically 5%. In other words, T1 and $T1_{ref}$ are declared equal if:

$$0.95 \cdot T1_{ref} \leq T1 \leq 1.05 \cdot T1_{ref}$$

Below, to simplify, it is acknowledged that:
T1=$T1_{ref}$ means that $0.95 \cdot T1_{ref} \leq T1 \leq 1.05 \cdot T1_{ref}$;
T1>$T1_{ref}$ means that T1>$1.05 \cdot T1_{ref}$;
T1<$T1_{ref}$ means that T1<$0.95 \cdot T1_{ref}$;
T1≠$T1_{ref}$ means that T1>$T1_{ref}$ or T1<$T1_{ref}$.

The response times $\Delta t_P$, $\Delta t_S$, and $\Delta t_B$ can undergo drifts that result from wear by friction and by mechanical fatigue of the movable parts of the solenoid valves 16, 19 and distributors 33, 38. It is possible to imagine regularly reprogramming the response time of solenoid valves 16, 19 and distributors 33, 38, but a complete stopping of the machine is necessary to carry out the measurements, which hampers the production.

This is why it is preferable to monitor—and to correct if necessary—the noted drifts of T1 in relation to $T1_{ref}$.

For each forming unit 1, the control unit 4 calculates the interval T1 starting from the stored values of $t_{B2}$ and $t_{S2}$: T1=$t_{S2}-t_{B2}$ and compares T1 to the reference value $T1_{ref}$. This calculation and this comparison can be made with each cycle (and more specifically at the end of each cycle, i.e., between the evacuation of a formed container 2 and the loading of a new blank 3), or periodically (for example, every five to ten cycles). When the calculation is carried out periodically, the comparison with the reference value $T1_{ref}$ can be carried out based on an average of values of T1 measured during multiple successive cycles.

As long as T1≠$T1_{ref}$, then the control unit 4 offsets the boxing starting signal $t_{B1}$ for the following cycle, in such a way as to recalibrate T1 on $T1_{ref}$.

This recalibration is carried out by offsetting the boxing starting signal $t_{B1}$, on command of the control unit 4 acting on the sole distributor 33. It is actually assumed that the offsetting of the blow-molding starting signal $t_{S1}$ is carried out separately by the control unit 4 based on other parameters (in particular the correct positioning of a pressure peak during the pre-blow-molding phase).

To better explain the correction applied by the control unit 4, the forming cycles are indexed by assigning to a given cycle the integral index N and to the following cycle the index N+1, in the manner of mathematical procedures.

When, for the cycle N (or for a predetermined number of cycles N−P to N, where P is a positive integral index that is less than N), $T1(N) \neq T1_{ref}$, the control unit 4 carries out for the following cycle N+1 the offsetting of the boxing starting signal $t_{B1}(N+1)$ by applying the following rule:

If $T1(N)=T1_{ref}$ then $t_{B1}(N+1)=t_{B1}(N)$, which maintains the boxing starting signal (and therefore the entire boxing phase), If $T1(N)>T1_{ref}$ then $t_{B1}(N+1)=t_{B1}(N)-(T1(N)-T1_{ref})$, which advances the boxing starting signal (and therefore the entire boxing phase), If $T1(N)<T1_{ref}$ then $t_{B1}(N+1)=t_{B1}(N)+(T1(N)-T1_{ref})$, which delays the boxing starting signal (and therefore the entire boxing phase).

(In the foregoing, T1(N) refers to the value of T1 in the cycle N or the average of T1 in the cycles N−P to N).

Such a cyclical correction limits the drift risk of T1 that, kept essentially constant during the cycles, promotes the uniformity and the quality of the containers produced.

Furthermore, T2 denotes the total duration of the boxing, i.e., the interval that separates the instant in time $t_{B2}$ of the real boxing start and the instant in time $t_{B3}$ of the end of boxing: $T2=t_{B3}-t_{B2}$.

It was actually noted that the quality of the containers also depends on the interval T2, which is advantageously to be kept essentially equal to a predetermined reference value $T2_{ref}$. This is why it is preferable to monitor—and to correct if necessary—the noted drifts of T2 in relation to $T2_{ref}$.

As above, the term "equal" does not mean that T2 and $T2_{ref}$ are strictly equal, but that the difference between them is imperceptible, i.e., less than several percent, typically 5%. In other words, T2 and $T2_{ref}$ are declared to be equal if:

$$0.95 \cdot T2_{ref} \leq T2 \leq 1.05 \cdot T2_{ref}$$

Below, to simplify, it is acknowledged that:
$T2=T2_{ref}$ means that $0.95 \cdot T2_{ref} \leq T2 \leq 1.05 \cdot T2_{ref}$;
$T2>T2_{ref}$ means that $T2>1.05 \cdot T2_{ref}$;
$T2<T2_{ref}$ means that $T2<0.95 \cdot T2_{ref}$;
$T2 \neq T2_{ref}$ means that $T2>T2_{ref}$ or $T2<T2_{ref}$.

The interval T2 is based on the boxing travel C and on the boxing speed, i.e., the speed of motion of the mold bottom 9 (and therefore of the piston 27).

During production, the travel C of the mold bottom 9 is stationary, because it is determined by the selection of the cylinder 23 and by its optional adjustment, which is done only periodically during the maintenance phases of the forming unit 1.

As can be seen in FIG. 4, the boxing speed is not constant during the boxing. Actually, the forces that oppose the raising of the mold bottom 9 grow with the increase in pressure in the blank 3 as soon as the former reaches the surface 10 of the mold bottom 9.

Any variation that affects the blow-molding curve consequently modifies the speed of motion of the mold bottom 9 and therefore the value of the interval T2.

The speed of motion of the mold bottom 9, however, can be modified from a cycle N (or cycles N−P to N) to the following cycle N+1, by action on the pressure modifier 37 and/or on the flow modifier 42.

For each forming unit 1, the control unit 4 calculates the interval T2 starting from the stored values of $t_{B2}$ and $t_{B3}$: $T2=t_{B3}-t_{B2}$ and compares T2 to the reference value $T2_{ref}$. since T1, T2 can be corrected in each cycle or periodically. In this latter case, the comparison with the reference value $T2_{ref}$ can be based on an average of the values of T2 that are measured during multiple successive cycles.

As long as $T2 \neq T2_{ref}$, then the control unit 4 modifies the fluid pressure in the area of the pressure modifier 37 and/or the fluid flow rate in the area of the flow modifier 42, in such a way as to recalibrate T2 on $T2_{ref}$.

More specifically, when, for the cycle N (or for the cycles N−P to N), $T2(N) \neq T2_{ref}$, the control unit 4 carries out for the following cycle N+1 the modification of the pressure in the area of the pressure modifier 37 and the flow rate in the area of the modifier 37 by applying the following rule:

If $T2(N)=T2_{ref}$ then the flow rate is maintained,

If $T2(N)>T2_{ref}$ then the flow rate is increased to increase the boxing speed and thus to advance the instant in time $t_{B3}$, If $T2(N)<T2_{ref}$ then the flow rate is reduced to decrease the boxing speed and thus to delay the instant in time $t_{B3}$.

(In the foregoing, T2(N) refers to the value of T2 in the cycle N or the average of T2 in the cycles N−P to N).

Such a cyclical correction limits the drift risk of T2, whose regulation promotes the uniformity and the quality of the containers produced.

As an alternative to the regulation of the interval T2, there can be initiated, for the same reasons and in the same manner, the regulation of an interval T3 that separates the instant in time $t_{S3}$ in which the pressure in the container 2 reaches the value of the blow-molding pressure and the instant in time $t_{B3}$ of the end of boxing: $T3=t_{B3}-t_{S3}$.

In this case, it is the interval T3 that it is advantageous to maintain, from a cycle N (or cycles N−P to N) to the following cycle N+1, equal to a predetermined reference value $T3_{ref}$. It is then preferable to monitor in each cycle—and to correct, if necessary—the noted drifts of T3 in relation to $T3_{ref}$.

As above, the term "equal" does not mean that T3 and $T3_{ref}$ are strictly equal, but that the difference between them is imperceptible, i.e., less than several percent, typically 5%. In other words, T3 and $T3_{ref}$ are declared to be equal if:

$$0.95 \cdot T3_{ref} \leq T3 \leq 1.05 \cdot T3_{ref}$$

Below, to simplify, it is acknowledged that:
$T3=T3_{ref}$ means that $0.95 \cdot T3_{ref} \leq T3 \leq 1.05 \cdot T3_{ref}$;
$T3>T3_{ref}$ means that $T3>1.05 \cdot T3_{ref}$;
$T3<T3_{ref}$ means that $T3<0.95 \cdot T3_{ref}$;
$T3 \neq T3_{ref}$ means that $T3>T3_{ref}$ or $T3<T3_{ref}$.

Like T2, T3 is based on the boxing travel C (stationary during production) and the boxing speed, which can be modified from a cycle N (or cycles N−P to N) to the following cycle N+1, by action on the pressure modifier 37 and/or on the flow modifier 42. T3, however, is also based on the blow-molding pressure, which determines $t_{S3}$.

For each forming unit 1, the control unit 4 calculates the interval T3 from stored values of $t_{S3}$ and $t_{B3}$: $T3=t_{B3}-t_{S3}$ and compares T3 to the reference value $T3_{ref}$. Like T1 or T2, T3 can be corrected in each cycle or periodically. In this latter case, the comparison with the reference value $T3_{ref}$ can be based on an average of the values of T3 that are measured during multiple successive cycles.

As long as $T3 \neq T3_{ref}$ then the control unit 4 modifies the pressure in the area of the modifier 37 and/or the fluid flow rate in the area of the modifier 42, in such a way as to recalibrate T3 on $T3_{ref}$.

More specifically, when, for the cycle N (or for the average of the cycles N−P to N), $T3(N) \neq T3_{ref}$, the control unit 4 carries out for the following cycle N+1 the modification of the pressure in the area of the modifier 37 and/or the flow rate in the area of the modifier 42 by applying the following rule:

If T3(N)=T3$_{ref}$, then the flow rate is maintained,

If T3(N)>T3$_{ref}$, then the flow rate is increased to increase the boxing speed and thus to advance the instant in time t$_{B3}$, If T3(N)<T3$_{ref}$, then the flow rate is reduced to decrease the boxing speed and thus to delay the instant in time t$_{B3}$.

(In the foregoing, T3(N) refers to the value of T3 in the cycle N or the average of T3 in the cycles N−P to N).

Such a cyclical correction limits the drift risk of T3, whose regulation promotes, like T2, the uniformity and the quality of the containers produced.

Furthermore, it was noted that various other measures, considered separately or in combination, can make it possible to improve the uniformity and the quality of the containers.

First of all, it is possible to detect a failure in the primary distributor 33 and/or in the cylinder 23 thanks to the value of the response time $\Delta t_B$. More specifically, as we have seen, the response time $\Delta t_B$ is a composite length of time that is equal to the sum of the response time, denoted $\Delta t_{BD}$, the distributor 33, and that, denoted $\Delta t_{BV}$, of the cylinder 23:

$$\Delta t_B = \Delta t_{BD} + \Delta t_{BV}$$

Using a pressure sensor mounted in the primary chamber 29 and connected to the control unit 4 that collects the data therefrom, it is possible to measure the pressure in the primary chamber 29 and consequently to deduce therefrom a value of the response time $\Delta t_{BD}$, equal to the length of time that separates the boxing starting signal t$_{B1}$ from the instant in time when the pressure begins to increase in this chamber 29.

The control unit 4 can be programmed to compare $\Delta t_{BD}$ to a predetermined threshold value (corresponding to a nominal operation of the primary distributor 33) and, when $\Delta t_{BD}$ is declared to be greater than or equal to this threshold value, to end in a failure of the primary distributor 33 and to generate an alert signaling this failure and recommending, for example, a stopping of the forming unit 1 for the purpose of replacing the primary distributor 33 or carrying out manual control operations and/or repairs on the former.

Likewise, using a movement sensor coupled to the mold bottom 9 or to the rod 28 (which are integral) and connected to the control unit 4 that collects the data and in combination with the pressure sensor that is mounted in the primary chamber 29, it is possible to detect the movement of the mold bottom 9 and consequently to deduce therefrom a value of the response time $\Delta t_{BV}$, equal to the length of time that separates the rise in pressure in the primary chamber 29 and the instant in time when the rod 28 (and therefore the mold bottom 9) begins to move.

The control unit 4 can be programmed to compare $\Delta t_{BV}$ to a predetermined threshold value (corresponding to a normal operation of the cylinder 23) and, when $\Delta t_{BV}$ is declared to be greater than or equal to this threshold value, to end in a failure of the cylinder 23 and to generate an alert signaling this failure and recommending, for example, a stopping of the forming unit 1 for the purpose of replacing the cylinder 23 or carrying out manual control operations and/or repairs on the former.

A failure of the cylinder 23 can also be detected starting from the position curve of the mold bottom 9 (at the top in FIG. 4) and from the blow-molding curve (at the bottom in FIG. 4). More specifically, it is possible to verify the consistency between the position, denoted H$_{S2}$, of the mold bottom 9 at the instant in time t$_{S2}$ of the real beginning of the blow molding and the time period T2 of the boxing. This consistency can be verified by the control unit 4, which for this purpose can be programmed for verifying jointly that the position H$_{S2}$ is between two predetermined values and that the time period T2 is also between two predetermined values and, if these two cumulative conditions (corresponding to a good operation of the cylinder 23) are not verified, for generating an alert that signals a failure of the cylinder 23 and that recommends, for example, a stopping of the forming unit 1 for the purpose of replacing or carrying out control operations.

Secondly, it is possible to regulate the value of H$_{S2}$ (defined above) by means of the flow modifier 42, directed by the control unit 4.

At the point of the coordinates (t$_{S2}$, H$_{S2}$), the boxing curve (at the top in FIG. 4) undergoes a modification of its slope, due to the sudden increase in the pressure in the blank 3, as the pressure curve demonstrates.

The position of the mold bottom 9 at the instant in time t$_{S2}$, i.e., the value of H$_{S2}$, is to be regulated in a relatively precise manner because the quality of the container 2 depends on it. Actually, if the mold bottom 9 is positioned too low at the instant in time t$_{S2}$, a pinching of the material may occur between the mold bottom 9 and the opening 8 during the blow molding. In contrast, if the mold bottom 9 is positioned too high at the instant in time t$_{S2}$, the material of the blank 3 cannot correctly take the impression of the inner surface 10. The position of the mold bottom 9 at the instant in time t$_{S2}$ depends on the speed of motion of the mold bottom 9 and can consequently be regulated by means of the flow modifier 42.

Consequently, starting from measurements collected in the cycle N (or optionally over multiple cycles N−P to N), the control unit 4 verifies that H$_{S2}$ corresponds to a predetermined reference value and, if such is not the case, directs the flow modifier 42, starting from the cycle N+1:

To decrease the authorized flow rate in such a way as to slow the piston 27 if the value of H$_{S2}$ is greater (by means of a tolerance) than the reference value;

In contrast, to increase the authorized flow rate in such a way as to accelerate the piston 27 if the value of H$_{S2}$ is less (by means of a tolerance) than the reference value.

Finally, it will be noted that it may happen, following the actions of the control unit 4 mentioned above, that the flow modifier 42 is regulated at its minimum (i.e., that it leaves the fluid passage section completely open, in particular to increase the speed of motion of the piston 27 at constant pressure in the primary chamber 29) or in contrast at its maximum (i.e., that it blocks as much as possible the fluid passage section, in particular to decrease the speed of motion of the piston 27 at constant pressure in the primary chamber 29). In these two cases, the maneuvering margins offered to the control unit 4 for acting on the motion of the mold bottom 9 and, ultimately, on the boxing curve, are reduced. So as to allow the control unit 4 to regain these maneuvering margins, it can be provided to program the control unit 4 to act on the pressure modifier 37 in such a way as:

To decrease the pressure injected into the primary chamber 29 when the modifier 42 reaches its minimum flow rate;

In contrast, to increase the pressure that is injected into the primary chamber 29 when the modifier reaches its maximum flow rate.

The invention claimed is:

1. Method for manufacturing a container (2) from a blank (3) made of plastic material, within a mold (5) that is provided with a wall (6) defining a cavity (7) bearing the impression of the container (2), and an insert (9) that can move in relation to the wall (6) between a retracted position and a deployed position, with this method comprising, after an operation for inserting the blank (3) into the mold:

A pre-blow-molding phase comprising the injection into the blank (3) of a fluid at pre-blow-molding pressure;

A blow-molding phase, following the pre-blow-molding phase and comprising the injection into the blank (3) of a fluid at a blow-molding pressure that is higher than the pre-blow-molding pressure;

A boxing phase that comprises the movement of the insert (9) from a retracted position to a deployed position;

with this method comprising:

Measuring in real time the pressure that prevails in the blank (3);

Storing the values of the pressure that is measured and their respective measuring times;

Measuring in real time the position of the insert (9);

Storing the values of the measured position of the insert (9) and their respective measuring times;

Starting from the stored values of the pressure in the blank (3), detecting and storing an instant in time $t_{S2}$ that marks the real beginning of the blow-molding phase where a blowing solenoid valve (19) moves to an open position;

Starting from the measured position values of the insert (9), detecting and storing an instant in time $t_{B2}$ that marks the real beginning of the movement of the insert (9) where the insert (9) begins to move from the retracted position to the deployed position;

Calculating a first interval of time, denoted T1, separating $t_{B2}$ from $t_{S2}$, representing the time between the real beginning of the movement of the insert ($t_{B2}$) between the blowing solenoid valve opening ($t_{S2}$);

the method further comprising:

Comparing the interval T1 to a non-zero predetermined reference value $T1_{ref}$;

Offsetting an opening command initiation of the boxing phase where the first interval of time T1 is different from the reference value $T1_{ref}$.

2. Method according to claim 1, further comprising advancing the boxing phase as long as the first interval of time T1 is declared to be less than the reference value $T1_{ref}$.

3. Method according to claim 1, wherein with the insert (9) being integral with a rod (28) of the cylinder (23) that is fed by pressurized fluid by means of a distributor (33) configured to receive the opening command, the offsetting of the initiation of the boxing phase comprises offsetting the opening command of the distributor (33).

4. Method according to claim 1, further comprising:

Starting from values of the measured position of the insert (9), detecting an instant time $t_{B3}$ in which insert (9) reaches its top position, Calculating a second interval of time, denoted T2, separating $t_{B3}$ from $t_{B2}$;

Comparing the second interval of time T2 with a non-zero predetermined reference value $T2_{ref}$;

As long as the second interval of time T2 is declared to be different from the reference value $T2_{ref}$, modifying the speed of motion of the insert (9) during the boxing phase.

5. Method according to claim 4, wherein with the insert (9) being integral with a rod (28) of a cylinder (23) that is fed by pressurized fluid, the method further comprising:

Measuring the position ($H_{S2}$) of the insert (9) at the instant in time $t_{S2}$ marking the real beginning of the blow-molding phase, Verifying whether the position ($H_{S2}$) of the insert (9) is between two predetermined values and whether T2 is also between two predetermined values, If these two conditions are not jointly met, generating an alert.

6. Method according to claim 5, wherein with the cylinder (23) being connected to a drain (40) by means of a flow modifier (42), the method further comprising modifying the flow of fluid in the area of the flow modifier (42) if the position ($H_{S2}$) of the insert (9) is not encompassed by two predetermined values or if T2 is not encompassed by two predetermined values.

7. Method according to claim 1, further comprising:

Starting from the stored values of the pressure in the blank (3), detecting and storing an instant in time $t_{S3}$ in which the pressure in the blank (3) ceases to increase during the blow-molding phase;

Starting from the values of the measured position of the insert (9), detecting an instant in time $t_{B3}$ in which the insert (9) reaches its top position;

Calculating a third interval of time, denoted T3, separating $t_{S3}$ from $t_{B3}$;

Comparing the third interval of time T3 to a non-zero predetermined reference value $T3_{ref}$;

As long as the third interval of time T3 is declared to be different from the reference value $T3_{ref}$, modifying the speed of motion of the insert (9) during the boxing phase.

8. Method according to claim 7, wherein with the insert (9) being integral with a rod (28) of a cylinder (23) that is fed by pressurized fluid by means of distributor (33) configured to receive the opening command and with a pressure modifier (37), the modification of the speed of motion of the insert (9) comprises acting on the pressure modifier (37) to modify the pressure of the fluid that feeds the cylinder (23).

9. Method according to claim 1, wherein with the insert (9) being integral with a rod (28) of the cylinder (23) that is fed by pressurized fluid by means of a distributor (33) configured to receive the opening command, the method further comprising:

Measuring a response time of the cylinder (23) and/or a response time of the distributor (33), and Comparing this response time to a predetermined threshold value, When this response time is greater than the reference value, generating an alert.

10. Method according to claim 1, wherein with the insert (9) being integral with a rod (28) of a cylinder (23) that is fed by pressurized fluid by means of a distributor (33) configured to receive the opening command and with a pressure modifier (37), with the cylinder (23) also being connected to a drain (40) by means of a flow modifier (42), the method further comprising commanding the pressure modifier (37) to decrease, or to increase, the pressure injected into the cylinder (23) if the flow rate in the area of the modifier (42) reaches a minimum, or a maximum.

11. Method according to claim 2, wherein with the insert (9) being integral with a rod (28) of the cylinder (23) that is fed by pressurized fluid by means of a distributor (33) configured to receive the opening command, the offsetting of the initiation of the boxing phase comprises offsetting the opening command of the distributor (33).

12. Method according to claim 2, further comprising:

Starting from values of the measured position of the insert (9), detecting an instant in time $t_{B3}$ in which the insert (9) reaches its top position;

Calculating the second interval of time, denoted T2, separating $t_{B3}$ from $t_{B2}$;

Comparing the second interval of time T2 with a non-zero predetermined reference value $T2_{ref}$;

As long as the second interval of time T2 is declared to be different from the reference value $T2_{ref}$, modifying the speed of motion of the insert (9) during the boxing phase.

13. Method according to claim 3, further comprising:

Starting from values of the measured position of the insert (9), detecting an instant in time $t_{B3}$ in which the insert (9) reaches its top position;

Calculating the second interval of time, denoted T2, separating $t_{B3}$ from $t_{B2}$;

Comparing the second interval of time T2 with a non-zero predetermined reference value $T2_{ref}$;

As long as the second interval of time T2 is declared to be different from the reference value $T2_{ref}$, modifying the speed of motion of the insert (9) during the boxing phase.

14. Method according to claim 2, further comprising:

Starting from the stored values of the pressure in the blank (3), detecting and storing an instant in time $t_{S3}$ in which the pressure in the blank (3) ceases to increase during the blow-molding phase;

Starting from the values of the measured position of the insert (9), detecting an instant in time $t_{B3}$ in which the insert (9) reaches its top position;

Calculating the third interval of time, denoted T3, separating $t_{S3}$ from $t_{B3}$;

Comparing the third interval of time T3 to a non-zero predetermined reference value $T3_{ref}$;

As long as the third interval of time T3 is declared to be different from the reference value $T3_{ref}$, modifying the speed of the motion of the insert (9) during the boxing phase.

15. Method according to claim 2, further comprising:

Starting from the stored values of the pressure in the blank (3), detecting and storing an instant in time $t_{S3}$ in which the pressure in the blank (3) ceases to increase during the blow-molding phase;

Starting from the values of the measured position of the insert (9), detecting an instant in time $t_{B3}$ in which the insert (9) reaches its top position;

Calculating the third interval of time, denoted T3, separating $t_{S3}$ from $t_{B3}$;

Comparing the third interval of time T3 to a non-zero predetermined reference value $T3_{ref}$;

As long as the third interval of time T3 is declared to be different from the reference value $T3_{ref}$, modifying the speed of motion of the insert (9) during the boxing phase.

16. Method according to claim 2, wherein with the insert (9) being integral with a rod (28) of the cylinder (23) that is fed by pressurized fluid by means of a distributor (33) configured to receive the opening command, the method further comprising:

Measuring a response time of the cylinder (23) and/or a response time of the distributor (33), and Comparing this response time to a predetermined threshold value, When this response time is greater than the reference value, generating an alert.

17. Method according to claim 3, wherein with the insert (9) being integral with the rod (28) of the cylinder (23) that is fed by pressurized fluid by means of a distributor (33) configured to receive the opening command, the method further comprising:

Measuring a response time of the cylinder (23) and/or a response time of the distributor (33), and Comparing this response time to a predetermined threshold value, When this response time is greater than the reference value, generating an alert.

18. Method according to claim 4, wherein with the insert (9) being integral with a rod (28) of the cylinder (23) that is fed by pressurized fluid by means of a distributor (33) with a controlled opening configured to receive the opening command, the method further comprising:

Measuring a response time of the cylinder (23) and/or a response time of the distributor (33), and Comparing this response time to a predetermined threshold value, When this response time is greater than the reference value, generating an alert.

19. Method according to claim 5, wherein with the insert (9) being integral with the rod (28) of the cylinder (23) that is fed by pressurized fluid by means of a distributor (33) configured to receive the opening command, the method further comprising:

Measuring a response time of the cylinder (23) and/or a response time of the distributor (33), and Comparing this response time to a predetermined threshold value, When this response time is greater than the reference value, generating an alert.

20. Method according to claim 6, wherein with the insert (9) being integral with the rod (28) of the cylinder (23) that is fed by pressurized fluid by means of a distributor (33) configured to receive the opening command, the method further comprising:

Measuring a response time of the cylinder (23) and/or a response time of the distributor (33), and Comparing this response time to a predetermined threshold value, When this response time is greater than the reference value, generating an alert.

* * * * *